US010094986B2

(12) United States Patent
Barnette, Jr. et al.

(10) Patent No.: US 10,094,986 B2
(45) Date of Patent: *Oct. 9, 2018

(54) FIBER OPTIC CONNECTOR WITH VENTED FERRULE HOLDER

(71) Applicant: CORNING OPTICAL COMMUNICATIONS LLC, Hickory, NC (US)

(72) Inventors: Robert Elvin Barnette, Jr., Hickory, NC (US); John Wayne Beatty, Newton, NC (US); Hieu Vinh Tran, Charlotte, NC (US)

(73) Assignee: Corning Optical Communications LLC, Hickory, NC (US)

( * ) Notice: Subject to any disclaimer, the term of this patent is extended or adjusted under 35 U.S.C. 154(b) by 387 days.

This patent is subject to a terminal disclaimer.

(21) Appl. No.: 14/886,881

(22) Filed: Oct. 19, 2015

(65) Prior Publication Data

US 2016/0041346 A1 Feb. 11, 2016

Related U.S. Application Data

(63) Continuation of application No. PCT/US2014/037961, filed on May 14, 2014, which
(Continued)

(51) Int. Cl.
*B29C 65/00* (2006.01)
*B32B 37/00* (2006.01)
(Continued)

(52) U.S. Cl.
CPC ........... *G02B 6/3867* (2013.01); *G02B 6/245* (2013.01); *G02B 6/3869* (2013.01);
(Continued)

(58) Field of Classification Search
CPC .. G02B 6/3861; G02B 6/3887; G02B 6/3869; G02B 6/3833; G02B 6/3855;
(Continued)

(56) References Cited

U.S. PATENT DOCUMENTS 4,361,380 A 11/1982 Marazzi
4,695,124 A 9/1987 Himono et al.
(Continued)

FOREIGN PATENT DOCUMENTS

CN 1873451 A 12/2006
JP 10307233 A 11/1998
(Continued)

OTHER PUBLICATIONS

Thorlabs, Guide to Connectorization and Polishing Optical Fibers, 2006, 15 pages.
(Continued)

*Primary Examiner* — Philip C Tucker
*Assistant Examiner* — Brian R Slawski
(74) *Attorney, Agent, or Firm* — Adam R. Weeks

(57) ABSTRACT

A fiber optic connector includes a ferrule having a mating end and an insertion end and a ferrule holder having a first end portion in which the ferrule is received and a second end portion opposite the first end portion. The first end portion defines a first bore having a first bore width for receiving the ferrule. Additionally, the first end portion defines a bore surface and at least one groove formed in the bore surface. The at least one groove extends from where the insertion end of the ferrule is located within the first bore to a front face of the ferrule holder. Ridges are formed around the first bore because the at least one groove also extends in a circumferential direction. The ridges contact the ferrule and are deflected by the ferrule in a direction toward the insertion end of the ferrule.

15 Claims, 5 Drawing Sheets

Related U.S. Application Data is a continuation of application No. 13/905,490, filed on May 30, 2013, now Pat. No. 8,764,316.

(60) Provisional application No. 61/826,714, filed on May 23, 2013.

(51) Int. Cl.

| | | |
|---|---|---|
| *C09J 5/00* | (2006.01) | |
| *G02B 6/36* | (2006.01) | |
| *G02B 6/38* | (2006.01) | |
| *G02B 6/245* | (2006.01) | |
| *B29C 65/52* | (2006.01) | |
| *B29C 65/48* | (2006.01) | |
| *B29C 65/54* | (2006.01) | |

(52) U.S. Cl.
CPC ............ *G02B 6/3874* (2013.01); *B29C 65/48* (2013.01); *B29C 65/524* (2013.01); *B29C 65/542* (2013.01); *B29C 66/3032* (2013.01); *B29C 66/5221* (2013.01); *B29C 66/73365* (2013.01); *B29C 66/7465* (2013.01); *G02B 6/3821* (2013.01); *G02B 6/3861* (2013.01)

(58) Field of Classification Search
CPC .. G02B 6/3873; G02B 6/3874; G02B 6/3867; B29C 65/48; B29C 65/52; B29C 65/524; B29C 65/54; B29C 65/542; B29C 66/05; B29C 66/1142; B29C 66/3032; B29C 66/5221; B29C 66/7465; B29C 66/73365
USPC ... 156/60, 87, 157, 158, 247, 249, 250, 256, 156/268, 269, 272.2, 293, 294, 296, 156/303.1, 304.1, 304.2, 305; 385/78, 80, 385/81, 83, 84, 60, 62, 65, 66
See application file for complete search history.

(56) References Cited

U.S. PATENT DOCUMENTS

| | | |
|---|---|---|
| 5,278,928 A | 1/1994 | Ueda et al. |
| 5,381,497 A | 1/1995 | Toland et al. |
| 5,436,994 A | 7/1995 | Ott et al. |
| 5,703,982 A | 12/1997 | Takizawa |
| 5,858,161 A | 1/1999 | Nakajima et al. |
| 6,190,055 B1 | 2/2001 | Andersen |
| 6,238,103 B1 | 5/2001 | Ezawa |
| 6,287,404 B1 | 9/2001 | Kolasinski |
| 6,419,402 B1 | 7/2002 | Zimmel |
| 6,883,976 B2 | 4/2005 | Sato |
| 6,936,122 B2 | 8/2005 | Kolasinski |
| 7,048,448 B2 | 5/2006 | Rosenberg et al. |
| 7,314,317 B2 | 1/2008 | Hamasaki et al. |
| 7,708,470 B2 | 5/2010 | Cooke et al. |
| 8,132,969 B2 | 3/2012 | Liu et al. |
| 2002/0146214 A1 | 10/2002 | Tanaka et al. |
| 2003/0021546 A1 | 1/2003 | Sato |
| 2004/0247255 A1 | 12/2004 | Rosenburg et al. |
| 2008/0232742 A1 | 9/2008 | Cooke et al. |
| 2010/0040333 A1 | 2/2010 | Lewallen et al. |
| 2012/0063723 A1 | 3/2012 | Jenkins et al. |
| 2013/0089294 A1 | 4/2013 | Zimmel |
| 2014/0031556 A1 | 1/2014 | Renga et al. |

FOREIGN PATENT DOCUMENTS

| | | |
|---|---|---|
| JP | 2002098856 A | 4/2002 |
| JP | 2003195104 A | 7/2003 |
| JP | 2012103311 A | 5/2012 |
| KR | 101166804 B1 | 7/2012 |

OTHER PUBLICATIONS

Patent Cooperation Treaty International Search Report, Application No. PCT/US2014/037961, dated Sep. 16, 2015 4 pages.
Chinese Search Report CN201480038470.5 dated Sep. 18, 2016, China Patent Office, 2 Pgs.

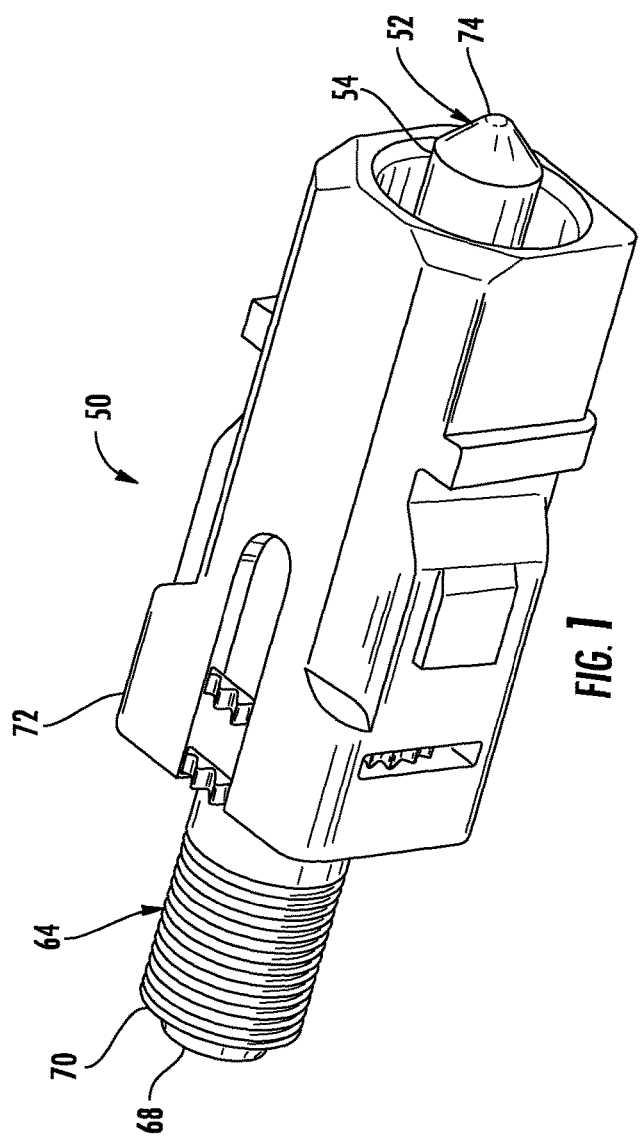
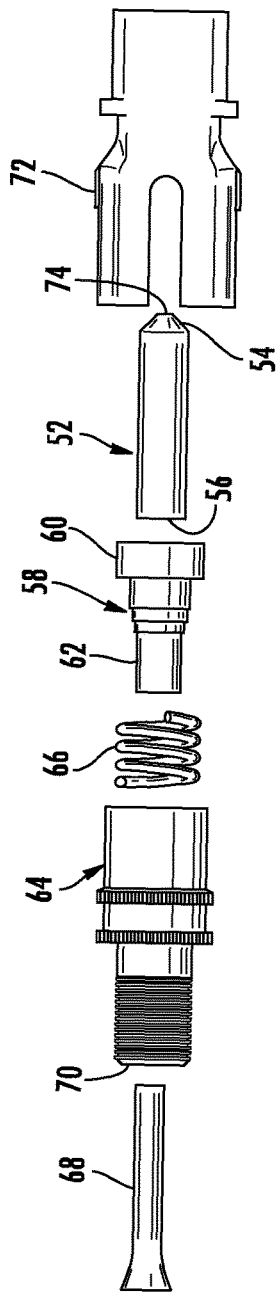
FIG. 1
FIG. 2

FIBER OPTIC CONNECTOR WITH VENTED FERRULE HOLDER

PRIORITY APPLICATIONS

This application is a continuation of International Application No. PCT/US14/37961, filed on May 14, 2014, which claims the benefit of priority to U.S. application Ser. No. 13/905,490, filed on May 30, 2013, now U.S. Pat. No. 8,764,316, and U.S. Provisional Application Ser. No. 61/826,714, filed on May 23, 2013, the content of all such applications being relied upon and incorporated herein by reference in entirety.

BACKGROUND

The disclosure relates generally to fiber optic connectors and more particularly to a fiber optic connector that reduces or eliminates the formation of air voids within adhesive used in the fiber optic connector. Related components, cable assemblies, and methods are also disclosed.

In a system that uses fiber optic cables, there are typically many locations where the cables connect to equipment or other fiber optic cables. Fiber optic connectors are provided on the ends of the cables to allow the transfer of light at these connection points. A fiber optic connector typically includes a ferrule with one or more bores that receive optical fiber(s) from the cable. The ferrule is held by a ferrule holder and serves to align the optical fiber(s) from the cable with optical fiber(s) or waveguides in a mating component (e.g., another connector or equipment).

The process of terminating individual optical fibers from a cable is referred to as "connectorization." Connectorization is an important step in the installation of fiber optic systems, whether done in a factory or the field. This is partly due to the number of potential sources for damage during the connectorization process. For example, one or more layers of material are typically stripped from the glass portion of the optical fiber so that only the glass portion (i.e., core and cladding) is inserted into the ferrule of the connector. In many instances this includes stripping a 900 micron-diameter buffer layer in a first step, and then stripping a 250 micron-diameter acrylic coating in a second step so that only a 125 micron-diameter glass portion remains. Stripping tools have been developed to reduce the likelihood of damaging the glass portion during these steps, but the potential remains nonetheless, especially in the region where a stripping tool begins to remove the buffer layer and/or outer coating.

Even if an optical fiber is properly stripped and prepared for insertion into the bore ("micro-hole") of a ferrule, the insertion itself can be challenging and has the potential to introduce flaws in the glass portion. For example, the ferrule bore typically includes a cone-shaped lead-in to facilitate directing the glass portion into the bore. An adhesive such as epoxy is first injected into the bore from the back end of the ferrule holder, thereby filling the bore, lead-in, and any space within the ferrule holder between the rear end of the ferrule and the injection needle. The injection needle is then removed, and the optical fiber is inserted through the adhesive and into the bore of the ferrule. Shear forces between the fiber and the adhesive may cause the fiber to buckle within the lead-in of the ferrule bore and perhaps even make contact with the edge of the ferrule.

An optical fiber that sustains damage from either or both of the above-described scenarios may still withstand failure in most conditions, especially if the glass portion is properly supported by adhesive within the ferrule. However, sometimes air or other gas can get trapped within the adhesive and cause voids. These voids may even end up around the damaged region of the glass portion and increase the potential for a fiber break. This is particularly true for cables used in an outside plant environment (i.e., outdoor cables or indoor/outdoor cables), which may be exposed to a variety of environmental and mechanical extremes.

These aspects can be better understood with reference to FIG. 3, which shows a portion of a conventional fiber optic connector 10 in an assembled state. A ferrule 12 is received in a ferrule holder 14, and an optical fiber 16 is secured in a ferrule bore 18 by adhesive 20. As can be seen, a buffer layer 22 and outer coating 24 have been stripped from the optical fiber 16 so that only a glass portion 26 (core and cladding) are inserted into the ferrule bore 18. The adhesive may surround portions of the outer coating 24 and buffer layer 22 as well.

An air void or bubble 30 may form in the adhesive when the adhesive is injected and/or when the adhesive injection needle (not shown) is withdrawn. Even if the air void 30 is formed in a region of the adhesive remote from where the optical fiber 16 is inserted, the air void 30 may migrate toward the optical fiber 16 during or after the insertion. This may ultimately result in the air void 30 contacting or surrounding a region of the glass portion 26 that is prone to damage. As can be seen, the damaged regions mentioned in both of the above-describe scenarios may be the same. That is, where the outer coating 24 is stripped from the optical fiber 16 may be the same place where the fiber has increased potential to buckle and contact an edge of the ferrule 12 during insertion into the ferrule bore 18. The presence of an air void creates a non-uniform distribution of the adhesive 20 around this damage-prone region in the lead-in 32 of the ferrule bore 18, which in turn can lead to increased loads/stresses on the damage-prone region during thermal expansions and the like. The loads/stresses may result in the optical fiber 16 breaking in this region. Therefore, a need exists to address the above-mentioned challenges.

SUMMARY

One embodiment of the disclosure relates to a fiber optic connector having a ferrule and ferrule holder. The ferrule includes a mating end and an insertion end. The ferrule holder includes a first end portion in which the ferrule is received and a second end portion opposite the first end portion. The first end portion defines a first bore having a first bore width for receiving the ferrule. Additionally, the first end portion defines a bore surface and at least one groove formed in the bore surface. The at least one groove extends from where the insertion end of the ferrule is located within the first bore to a front face of the ferrule holder. Ridges are formed around the first bore because the at least one groove also extends in a circumferential direction. The ridges contact the ferrule and are deflected by the ferrule in a direction toward the insertion end of the ferrule.

A method of manufacturing a fiber optic connector is also disclosed. The method generally comprises providing a ferrule holder having a first end portion that defines a first bore having a first bore width and a second end portion that defines a second bore having a second bore width. The second end portion is opposite the first end portion. At least one groove is formed in a bore surface defined by the first end portion of the ferrule holder. The at least one groove is shaped so that ridges are formed around the first bore. The method then further involves inserting a ferrule into the first bore of the ferrule holder. During this insertion the ferrule contacts and deflects the ridges in the first end portion of the ferrule holder so that the ridges become slanted and resist withdrawal of the ferrule.

Cable assemblies including at least one fiber optic connector are also disclosed. A cable assembly may include a fiber optic connector according to any of the embodiments disclosed herein, for example, and a fiber optic cable having at least one optical fiber extending into the ferrule of the fiber optic connector from the insertion end of the ferrule. The at least one optical fiber is received in the second end portion of the ferrule holder before extending into the ferrule.

In some embodiments, the ferrule holder of the fiber optic connector in the cable assembly further includes a third bore between the first and second bores, and the fiber optic cable further includes a buffer layer surrounding the optical fiber. The third bore has a third bore width smaller than the second bore width and is sized to prevent to prevent the buffer layer from entering the third bore. In a further aspect or embodiment, the ferrule holder may be shaped so that the buffer layer is spaced a first distance from the insertion end of the ferrule, with the first distance being greater than about 1.5 mm. In yet another aspect or embodiment, the at least one optical fiber may include a glass portion and an outer coating. A portion of the outer coating is stripped from the glass portion to form an exposed section of the glass portion, and the outer coating is spaced from the ferrule by a distance long enough such that the exposed section of the glass portion begins in the third bore.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 is a perspective view of one embodiment of a fiber optic connector.

FIG. 2 is an exploded plan view of the fiber optic connector shown in FIG. 1.

DETAILED DESCRIPTION

Figure 3:
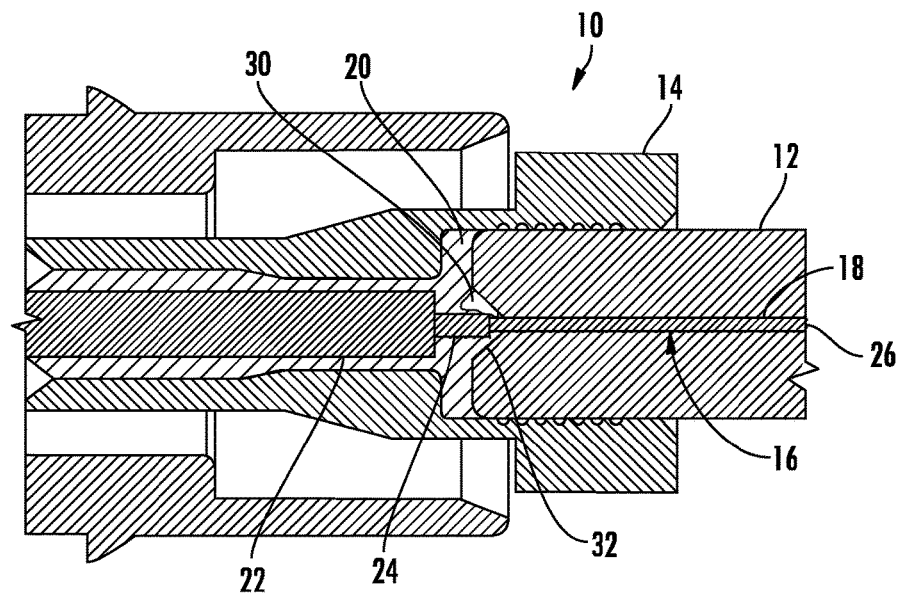
FIG. 3 is a cross-sectional view of a portion of a fiber optic cable assembly having a fiber optic connector with a conventional arrangement.

Various embodiments will be further clarified by the following examples. To this end, FIGS. 1 and 2 illustrate one example of a fiber optic connector 50 ("connector") for a cable assembly (the cable is not shown). Although the connector 50 is shown in the form of a SC-type angled physical contact (APC) connector, the description below relates to details that may apply to other types of fiber optic connectors. This includes ST, LC, FC, and MU-style connectors with or without angled end faces, for example.

In general, the connector 50 includes a ferrule 52 having a mating end 54 and an insertion end 56, a ferrule holder 58 having opposed first and second end portions 60, 62, and an inner housing 64. The insertion end 56 of the ferrule 52 is received in the first end portion 60 of the ferrule holder 58 while the mating end 54 remains outside the ferrule holder 58. The second end portion 62 of the ferrule holder 58 is received in the inner housing 64. A spring 66 may be disposed around the second end portion 62 and configured to interact with walls of the inner housing to bias the ferrule holder 58 (and ferrule 52). Additionally, a lead-in tube 68 may extend from a rear end 70 of the inner housing 64 to within the second end portion 62 of the ferrule holder 58 to help guide the insertion of an optical fiber (not shown in FIGS. 1 and 2) into the ferrule 52. An outer shroud 72 is positioned over the assembled ferrule 52, ferrule holder 58, and inner housing 64, with the overall configuration being such that the mating end 54 of the ferrule 52 presents an end face 74 configured to contact a mating component (not shown).

In a manner not shown herein, a fiber optic cable providing the optical fiber also includes one or more layers of material (e.g., strength layer of aramid yarn) that may be crimped onto the rear end 70 of the inner housing 64. A crimp band may be provided for this purpose. Additionally, a strain-relieving boot may be placed over the crimped region and extend rearwardly to cover a portion of the fiber optic cable. Variations of these aspects will be appreciated by persons skilled in the design of fiber optic cable assemblies. Again, the embodiment shown in FIGS. 1 and 2 is merely an example of a fiber optic connector to which the details described below may apply. The general overview has been provided simply to facilitate discussion and put the details in context.

Figure 4:
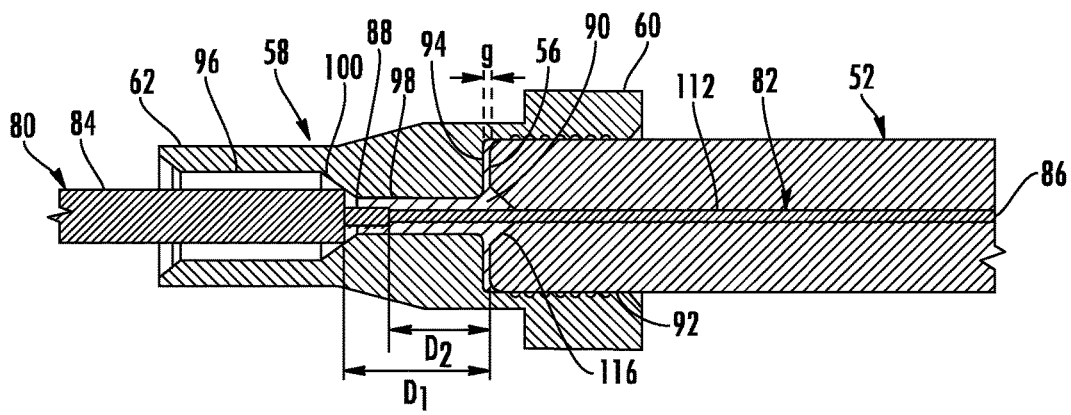
FIG. 4 is a cross-sectional view of a portion of a fiber optic cable assembly having a fiber optic connector according to one embodiment of this disclosure.

With this in mind, FIG. 4 illustrates the ferrule 52, ferrule holder 58, and inner housing 64 in further detail. An optical fiber 82 has been inserted into the ferrule 52 from the second end portion 62 of the ferrule holder 58. Specifically, the optical fiber 82 is part of a fiber optic cable 80 having a buffer layer 84 that surrounds the optical fiber 82. A portion of the buffer layer 84 has been stripped from the optical fiber 82, which includes a glass portion 86 in the form of a core and cladding and an outer coating 88 (typically acrylic). A portion of the outer coating 88 has also been stripped off so that only the glass portion 86 is inserted into the ferrule 52. The insertion process will be described in detail further below.

The optical fiber 82 is secured within the ferrule 52 and ferrule holder 58 by adhesive 90, which may be an epoxy. Particular features on the ferrule holder 58 help ensure that the optical fiber 82 is sufficiently encapsulated by the adhesive 90 within the ferrule holder 58 so as to reduce the chances of the optical fiber 82 breaking during thermal expansions and other stress-inducing conditions. These features include geometry of the ferrule holder 58 that separates the damage-prone areas discussed in the background section (with reference to FIG. 3) and/or features on the ferrule holder 58 that help reduce or eliminate the formation of air voids or bubbles in the adhesive 90.

Figure 5:
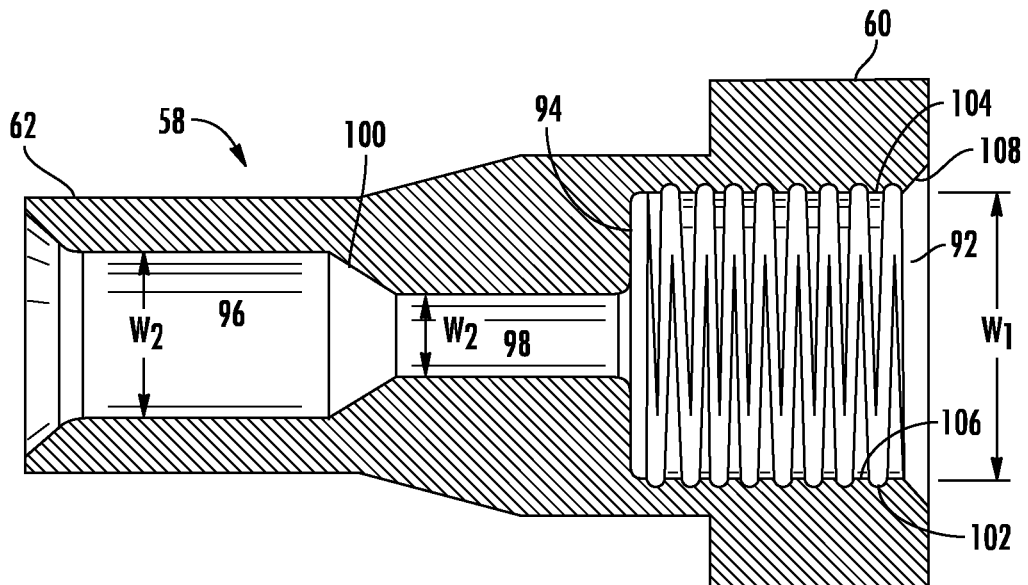
FIG. 5 is a cross-sectional view of a ferrule holder used in the fiber optic connector of FIG. 4.

To this end, and with additional reference to FIG. 5, the first end portion 60 of the ferrule holder 58 defines a first bore 92 having a first bore width ($W_1$) for receiving the ferrule 52. A slight interference fit may be provided. The first end portion 60 is also shaped so that a gap (g) is maintained between the insertion end 56 of the ferrule 52 and an inner wall 94 of the ferrule holder 58 that represents an end of the first bore 92. The second end portion 62 of the ferrule holder 58 defines a second bore 96 having a second bore width ($W_2$). The ferrule holder 58 may also include a third bore 98 defined by a through passage between the first and second bores 92, 96, with the third bore 98 having a third bore width ($W_3$). As used herein, the term "bore width" refers to bore diameter when the associated bore is cylindrical. The third bore width is smaller than the second bore width so that the buffer layer 84 is prevented from entering the third bore 98. If desired, a transition area 100 may be provided in the second bore 96 to serve as a hard stop for the buffer layer 84. The transition area 100 in the embodiment shown defines a chamfered step having an angle (a) relative to a longitudinal axis of the ferrule holder 58.

The first, second, and third bore widths have particular relationships with respect to each other and/or the ferrule width/diameter. The purpose of these relationships will soon be more apparent. The same applies to the length of the third bore 98 and the gap maintained between the insertion end 56 of the ferrule 52 and an inner wall 94 of the ferrule holder 58.

The ferrule holder 58 may also have a groove 102 formed in a bore surface 104 defined by the first end portion 60. In the particular embodiment shown, the groove 102 is an internal thread such that helical ridges 106 are formed around the first bore 92 (the ridges 106 have crests defined by the bore surface 104). Other groove designs are possible, however, as long as at least one groove extends in a circumferential direction so that ridges are formed completely or partially around the first bore 92. For example, in an alternative embodiment the ferrule holder 58 may include discrete grooves extending only in a circumferential direction or both in a circumferential and axial direction. One or more axial grooves may be provided to interconnect the discrete grooves so that at least a portion of the groove pattern in general extends from where the insertion end 56 of the ferrule 52 is located within the first bore 92 to an entrance 108 of the first bore 92. Other variations will be appreciated by persons skilled in the design of fiber optic connectors. The same applies to the manner in which the groove 102 is formed. That is, persons skilled in the design of fiber optic connectors will appreciate different ways of forming the groove 102, such as by machining or molding, based on the groove pattern, material of the ferrule holder 58, and other considerations.

Figure 6:
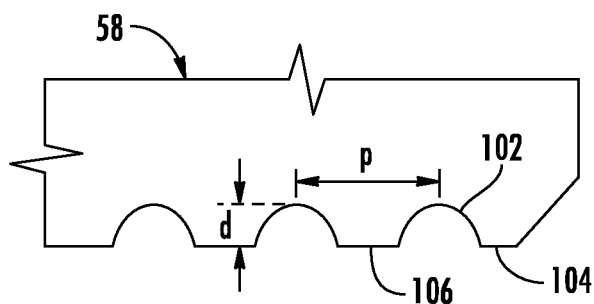
FIG. 6 is schematic view of a portion of the ferrule holder of FIG. 5.
Figure 7:
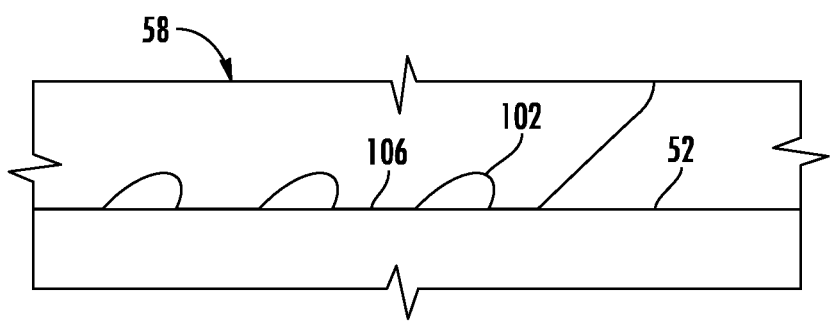
FIG. 7 is a schematic view similar to FIG. 6 but showing the ferrule holder after a ferrule has been inserted therein.

FIG. 6 illustrates how the groove 102 may be provided with a particular depth (d) relative to the bore surface 104 and have a particular pitch (p). In general, the depth and pitch are selected so that the ridges 106 are deflected by the ferrule 52 when the ferrule 52 is inserted into the first bore 92, as illustrated in FIG. 7. Therefore, in the final assembly the ridges 106 contact the ferrule 52 and slant, bend, lean, or otherwise angle in a direction toward the insertion end 56 of the ferrule 52. Such an arrangement has the benefit of helping resist withdrawal of the ferrule 52 from the ferrule holder 58. A stronger gripping force is provided to help keep the ferrule 52 secure.

Figure 8A:
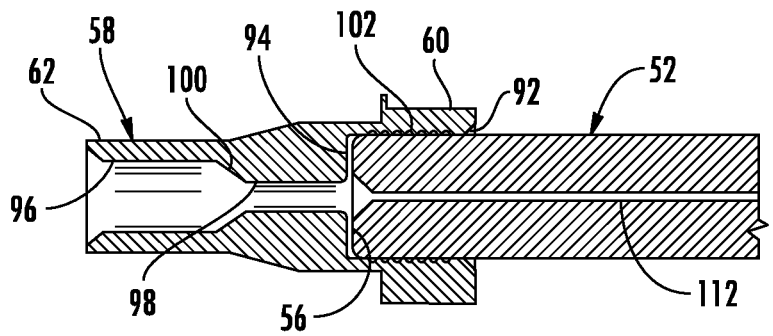
FIGS. 8A-8E are cross-sectional views sequentially illustrating a method of terminating an optical fiber with the fiber optic connector of FIG. 4.
Figure 8B:
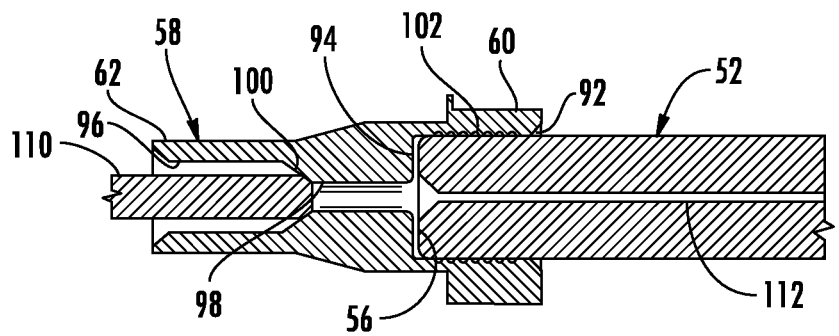

Other advantages associated with the groove 102 can be better understood with reference to FIGS. 8A-8E, which illustrate the process for securing the optical fiber 82 within the ferrule 52. This process terminates the cable 80 with the connector 50 to form a cable assembly. First, as shown in FIG. 8A, the ferrule 52 is inserted into the first bore 92 of the ferrule holder 58. Again, the ridges 106 (FIGS. 6 and 7) are deflected by the ferrule 52 during this insertion to provide a better gripping force for securing the ferrule 52. An injection needle 110 (FIG. 8B) or other adhesive delivery device is then introduced into the second end portion 62 of the ferrule holder 58 via the second bore 96. Eventually the injection needle 110 is pressed against the transition area 100, which provides a hard stop by limiting further insertion. The chamfered or otherwise tapered shape of the transition area 100 helps align the injection needle 110 with the third bore 98. In the embodiment shown, the injection needle 100 has an inner diameter that corresponds to the third bore width. The interaction between the injection needle 110 and transition area 100 (i.e., the hard stop) is such that the end/inner diameter of the injection needle 100 is positioned at the entrance to the third bore 98. In essence, a continuous, constant-diameter pathway is established from the injection needle 110 to the third bore 98.

Figure 8C:
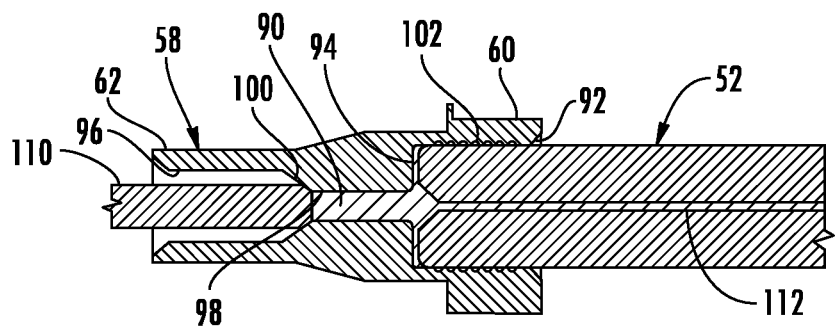

FIG. 8C illustrates how adhesive 90 (e.g., epoxy) is next delivered from the injection needle 110 into the ferrule holder 58. The adhesive 90 supplied by the injection needle 110 flows through the third bore 98 and into the first bore 92 to fill the gap between the insertion end 56 of the ferrule 52 and inner wall 94 of the first bore 92. Eventually the adhesive 90 is also forced into a ferrule bore 112 ("microhole"). Although the groove 102 in the bore surface 104 of the ferrule holder 58 may extend from the gap to the end face of the ferrule holder 58 and thereby provide another path for the adhesive 90, the size and length of the groove 102 is designed to make such a path more resistant to flow than the ferrule bore 112. Accordingly, the adhesive 90 fills the ferrule bore 112 before the adhesive 90—or at least before any significant amount of the adhesive 90—enters the groove 102 and flows around the ferrule 52.

Figure 8D:
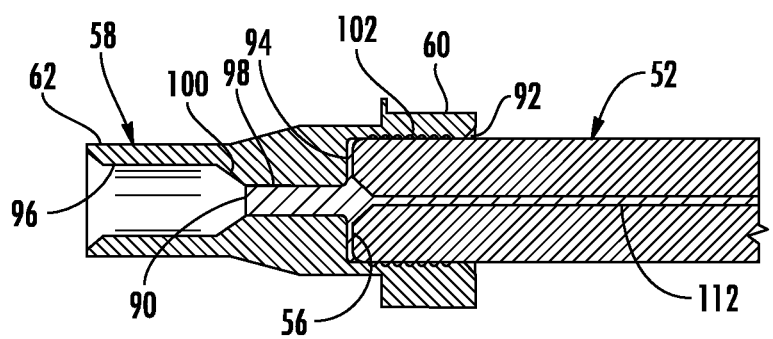

Eventually the injection needle 110 is removed from the ferrule holder 58, as shown in FIG. 8D. The hard stop provided by the second bore 96 (and specifically the transition area 100 in the embodiment shown) and matching diameters of the injection needle 110 and third bore 98 help prevent the injection needle 110 from being pulled back through any adhesive. This, in turn, helps prevent the formation of air voids within the adhesive 90 because no adhesive is pulled away from the walls of the ferrule holder 58 by the injection needle 110 (e.g., through surface tension or otherwise) upon withdrawing the injection needle 110.

Figure 8E:
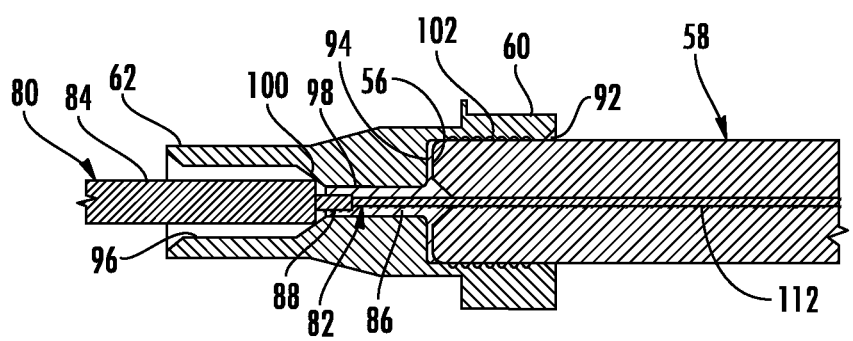

Finally, as shown in FIG. 8E, the optical fiber 82 is inserted into the second end portion 62 of the ferrule holder 58. This occurs after the optical fiber 82 has been prepared for insertion by stripping a portion of the buffer layer 84 and a portion of the outer coating 88, leaving the glass portion 86 exposed. The glass portion 86 extends through the adhesive 90 and into the ferrule bore 112 as the optical fiber 82 is inserted. The insertion continues until the buffer layer 84 remaining on the optical fiber 82 contacts a hard stop provided by the second bore 96 (again, specifically the transition area 100 in the embodiment shown). At this point the glass portion 86 extends through the ferrule bore 112 and beyond (or at least to) the mating end 54. The adhesive 90 is then allowed to cure before performing any remaining steps commonly performed to terminate an optical fiber, such as polishing the end of the glass portion 86.

Advantageously, the groove 102 in the ferrule holder 58 serves as a vent while the adhesive 90 cures. Air or gas that may be present in the adhesive 90 is able to move into the groove 102 and ultimately vent to the surrounding. Thus, although air voids or gas bubbles may be less likely to form in the adhesive 90 due to the features above (e.g., the injection needle ID matching the third bore width), the potential for some air or gas to be present in the adhesive 90 nevertheless remains. The air or gas may be present in the adhesive 90 even before the adhesive 90 is supplied by the injection needle 110, for example. There may also be debris present in the ferrule holder 58 prior to supplying the adhesive 90. Rather than becoming trapped in the adhesive 90, the debris can migrate into the groove 102 and possibly even out from the adhesive 90 while the adhesive 90 cures. Thus, the groove 102 serves as a vent for air, gas, and/or debris.

Recall that the groove 102 is shaped such that the ridges 106 (FIGS. 6 and 7) are deflected during the insertion of the ferrule 52 into the ferrule holder 58. The groove depth and pitch are selected to not only provide this deflection and the resulting "gripping force," but also to maintain the venting feature mentioned above. That is, upon insertion of the ferrule 52, surface contact between the ferrule 52 and ridges 106 cause the ridges 106 to deflect or "fold over" without clogging or otherwise closing/interrupting the groove 102. Material on the ferrule holder 58 is not sheared off into the groove 102, for example, such that air, gas, and/or debris are still able to be vented from the adhesive 90.

In one embodiment, the groove 102 has a depth that is from about 2% to about 3.5% of the diameter of the ferrule 52 to provide the above-mentioned effects. Accordingly, for a 2.5 mm-diameter ferrule, the groove has a depth that is from about 50.8 microns (0.002") to about 88.9 microns (0.0035"). Applicants have found particularly good results when the groove has a depth that is about 2.5% of the diameter of the ferrule. This corresponds to a depth of about 63.5 microns (0.0025") for a 2.5 mm-diameter ferrule. Thus, particularly advantageous embodiments may be those falling within a smaller range of groove depths, such as those have a groove depth that is from about 2.4% to about 2.6% of the diameter of the ferrule.

In terms of the pitch for embodiments with groove depths comparable to those mentioned above, Applicants have found values ranging from about 10% to about 12% of the diameter of the ferrule to be particularly effective at providing the gripping and venting benefits. These values correspond to a pitch ranging from about 250 microns (0.0098") to about 300 microns (0.0118) for a 2.5 mm-diameter ferrule, for example. An example of an embodiment falling within this range is the grooves having a pitch of about 266.7 microns (0.0105"). The term "pitch" is used in a broad sense in this disclosure to refer to distance parallel to a central axis of the ferrule holder 58 between corresponding points on adjacent ridges 106. Thus, even if the groove does not comprise an internal thread, the distance between adjacent, circumferentially-extending ridges is considered to be a pitch. The above examples of ranges of pitches may therefore apply to these and other embodiments.

By reducing or eliminating the formation of voids and presence of debris in the adhesive 90, the optical fiber 82 is better encapsulated/surrounded by the adhesive 90. Any stresses imparted by environmental conditions or otherwise can be distributed more evenly so as to reduce the potential for a fiber break. The optical fiber 82 is also better encapsulated by the adhesive 90 compared to conventional designs (e.g., FIG. 3) in the sense that a section of the glass portion 86 is covered by the adhesive 90 behind the ferrule 52.

To this end, and referring back to FIG. 4, the presence of the third bore 98 in general and the third bore width being smaller than the diameter of the buffer layer 84 results in the buffer layer 84 being spaced from the insertion end 56 of the ferrule 52 by a first distance ($D_1$). The first distance is long enough such that the outer coating 88 of the optical fiber 82 is also spaced from the insertion end 56 of the ferrule 52. In other words, the region of the optical fiber 82 where the outer coating 88 has been stripped away to expose the bare glass portion 86 is also spaced from the ferrule 52 by a distance (e.g., a second distance $D_2$). This second distance is long enough such that the exposed section of the glass portion 86 begins in the third bore 98, leaving more of the glass portion 86 exposed behind the ferrule 12. Therefore, the adhesive 90 surrounds an increased length of the glass portion 86 within the ferrule holder 58 compared to conventional designs, which helps secure the optical fiber 82. The bond length of the optical fiber 82 is longer, which effectively increases the overall pull strength of the cable assembly. Additionally, the damage-prone region of the optical fiber 82 from stripping the buffer layer 84 and/or outer coating 88 (i.e., where the exposed glass portion 86 begins, as explained above) is now separated from the damage-prone region from insertion (i.e., the region in or near a lead-in 116 of the ferrule bore 112, as explained above). This further helps reduce the likelihood of a fiber break due to stresses in that there is no region of the optical fiber likely to have increased damage. The first distance $D_1$ may be greater than about 1.5 mm in some embodiments to effectively provide these benefits. For example, the first distance $D_1$ may be about 2 mm in some embodiments.

The first, second, and third bore widths may have particular relationships with respect to each other to provide the above-mentioned benefits. For example, in some embodiments the second bore width may be from about 55% to about 60% of the first bore width. The third bore width may be: a) from about 20% to about 30% of the first bore width, b) from about 22% to about 26% of the first bore width, or c) about 24% of the first bore width. The relationships may alternatively be expressed as ratios involving the first bore width. For example, the ratio of the first bore width to the second bore width may be: a) from about 1.6 to about 1.9, or b) about 1.8. The ratio of the first bore width to the third bore width may be: a) from about 3.9 to about 4.3, or b) 4.1. The ratio of the second bore width to the third bore width may be: a) from about 1.9 to about 2.4, or b) about 2.3. For the transition area 100, the angle α may be from about 20 degrees to about 50 degrees.

It will be apparent to those skilled in the art that various modifications and variations can be made without departing from the spirit or scope of the disclosure. For example, although the embodiments described above are single-fiber connectors, it will be apparent that multi-fiber connectors (e.g., MTP connectors) may be provided with the same features. The bores in the ferrule holder may not necessarily be circular in such embodiments, but a groove may nevertheless be provided to result in the increased gripping and venting mentioned above. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of manufacturing a fiber optic cable assembly, comprising:
   inserting a ferrule into a first bore of a ferrule holder, wherein the first bore is defined by a first end portion of the ferrule holder and has a first bore width, wherein the first end portion of the ferrule holder defines a bore surface and at least one groove is formed in the bore surface;
   introducing an adhesive delivery device into a second bore of the ferrule holder, wherein the second bore is defined by a second end portion of the ferrule holder opposite the first end portion and has a second bore width;
   pressing the adhesive delivery device against a hard stop in the ferrule holder, wherein the ferrule holder further includes a third bore between the first and second bores, the third bore having a third bore width smaller than the second bore width and smaller than the adhesive delivery device to provide the hard stop;
   delivering adhesive through the third bore of the ferrule holder and into a ferrule bore of the ferrule, wherein the third bore width corresponds to an inner diameter of the adhesive delivery device from which the adhesive is delivered;
   withdrawing the adhesive delivery device from the ferrule holder;
   stripping a portion of an outer coating off a glass portion of an optical fiber; and
   inserting a fiber optic cable that includes the optical fiber through the third bore of the ferrule holder so that an exposed section of the glass portion of the optical fiber extends into the second end portion of the ferrule holder and into the ferrule, the fiber optic cable further including a buffer layer surrounding the optical fiber, wherein the third bore width is sized to prevent the buffer layer of the fiber optic cable from entering the third bore, and further wherein the outer coating is spaced from the ferrule by a distance long enough such that the exposed section of the glass portion begins in the third bore; and
   allowing the adhesive delivered into the ferrule holder to cure, wherein the at least one groove is configured to provide a vent for air, gas, and/or debris from the adhesive.

2. The method of claim 1, further comprising:
   forming the at least one groove in the ferrule holder so that the at least one groove extends from a rear portion of the first bore to a front face of the ferrule holder.

3. The method of claim 2, wherein forming the at least one groove comprises machining the at least one groove in the bore surface.

4. The method of claim 2, wherein forming the at least one groove comprises providing the at least one groove with a depth that is from about 2% to about 3.5% of the diameter of the ferrule.

5. The method of claim 4, wherein forming the at least one groove comprises providing the at least one groove with a depth that is from about 2.4% to about 2.6% of the diameter of the ferrule.

6. The method of claim 2, the at least one groove being shaped so that ridges are formed around the first bore, and wherein the at least one groove comprises an internal thread such that the ridges formed around the first bore are helical.

7. The method of claim 6, wherein the internal thread has a pitch that is from about 10% to about 12% of the diameter of the ferrule.

8. A method of manufacturing a fiber optic cable assembly, comprising:
   inserting a ferrule into a first bore of a ferrule holder, wherein the first bore is defined by a first end portion of the ferrule holder and has a first bore width, wherein the first end portion of the ferrule holder defines a bore surface and at least one groove is formed in the bore surface;
   introducing an adhesive delivery device into a second bore of the ferrule holder, wherein the second bore is defined by a second end portion of the ferrule holder opposite the first end portion and has a second bore width;
   pressing the adhesive delivery device against a hard stop in the ferrule holder, wherein the ferrule holder further includes a third bore between the first and second bores, the third bore having a third bore width smaller than the second bore width and smaller than the adhesive delivery device to provide the hard stop;
   delivering adhesive through the third bore of the ferrule holder and into a ferrule bore of the ferrule, wherein the third bore width corresponds to an inner diameter of the adhesive delivery device from which the adhesive is delivered;
   withdrawing the adhesive delivery device from the ferrule holder;
   stripping a portion of an outer coating off a glass portion of an optical fiber; and
   inserting a fiber optic cable that includes the optical fiber through the third bore of the ferrule holder so that an exposed section of the glass portion of the optical fiber extends into the second end portion of the ferrule holder and into the ferrule, the fiber optic cable further including a buffer layer surrounding the optical fiber, wherein:
      the third bore width is sized to prevent the buffer layer of the fiber optic cable from entering the third bore;
      the outer coating is spaced from the ferrule by a distance long enough such that the exposed section of the glass portion begins in the third bore; and
      the buffer layer is spaced a first distance from the insertion end of the ferrule after the step of inserting the fiber optic cable, the first distance being greater than about 1.5 mm; and
   allowing the adhesive delivered into the ferrule holder to cure, wherein the at least one groove is configured to provide a vent for air, gas, and/or debris from the adhesive.

9. The method of claim 8, wherein the first distance is about 2 mm.

10. The method of claim 8, further comprising:
   forming the at least one groove in the ferrule holder so that the at least one groove extends from a rear portion of the first bore to a front face of the ferrule holder, the at least one groove being shaped so that ridges are formed around the first bore, and the ferrule contacting and deflecting the ridges upon insertion so that the ridges resist withdrawal of the ferrule.

11. The method of claim 10, wherein forming the at least one groove comprises machining the at least one groove in the bore surface.

12. The method of claim 10, wherein forming the at least one groove comprises providing the at least one groove with a depth that is from about 2% to about 3.5% of the diameter of the ferrule.

13. The method of claim 12, wherein forming the at least one groove comprises providing the at least one groove with a depth that is from about 2.4% to about 2.6% of the diameter of the ferrule.

14. The method of claim 10, the at least one groove being shaped so that ridges are formed around the first bore, and wherein the at least one groove comprises an internal thread such that the ridges formed around the first bore are helical.

15. The method of claim 14, wherein the internal thread has a pitch that is from about 10% to about 12% of the diameter of the ferrule.

* * * * *